United States Patent
Nakata

(10) Patent No.: US 9,606,761 B2
(45) Date of Patent: Mar. 28, 2017

(54) INFORMATION PROCESSING APPARATUS FOR CONTROLLING AN OUTPUT PROCESS AND METHOD FOR THE SAME

(71) Applicant: CANON KABUSHIKI KAISHA, Tokyo (JP)

(72) Inventor: Hiroaki Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/773,279

(22) PCT Filed: Mar. 4, 2014

(86) PCT No.: PCT/JP2014/001161
§ 371 (c)(1),
(2) Date: Sep. 4, 2015

(87) PCT Pub. No.: WO2014/136429
PCT Pub. Date: Sep. 12, 2014

(65) Prior Publication Data
US 2016/0019014 A1 Jan. 21, 2016

(30) Foreign Application Priority Data
Mar. 7, 2013 (JP) .................................. 2013-045577

(51) Int. Cl.
*G06F 3/12* (2006.01)

(52) U.S. Cl.
CPC .......... *G06F 3/1276* (2013.01); *G06F 3/1204* (2013.01); *G06F 3/1224* (2013.01); *G06F 3/1285* (2013.01)

(58) Field of Classification Search
None
See application file for complete search history.

(56) References Cited

U.S. PATENT DOCUMENTS

2004/0137855 A1* 7/2004 Wiley ................... G06F 3/1204
455/88
2009/0323099 A1* 12/2009 Zhan ..................... G06F 3/1205
358/1.15

FOREIGN PATENT DOCUMENTS

| JP | 2001-236298 A | 8/2001 |
| JP | 2004-295357 A | 10/2004 |
| JP | 2007-200247 A | 8/2007 |
| JP | 2013-210921 A | 10/2013 |

* cited by examiner

*Primary Examiner* — Andrew H Lam
(74) *Attorney, Agent, or Firm* — Canon USA, Inc. IP Division

(57) ABSTRACT

The present invention relates to an information processing apparatus that performs control to write data requested to be output by a user to a predetermined file via a port monitor as a function of first output control software installed in an operating system, acquires the data written to the predetermined file, and performs output control on the acquired data to an external system on a network as a function of second output control software downloaded from an application management server and installed.

17 Claims, 19 Drawing Sheets

Fig. 14A

```
[FileSave]
printapp=123
```

Fig. 14B

| 123 | PRINTER APP FILE |

Fig. 14C

| EXTENSION | APPLICATION |
|---|---|
| .txt | notepad |
| .jpg | photo |
| .printapp | Printer App |
| | |

INFORMATION PROCESSING APPARATUS FOR CONTROLLING AN OUTPUT PROCESS AND METHOD FOR THE SAME

TECHNICAL FIELD

The present invention relates to a system for controlling an output process, such as printing, with a plurality of pieces of different output control software cooperating with one another.

BACKGROUND ART

Main examples of conventional output control software include device drivers including a printer driver for outputting print data to peripheral devices, such as a printer, present on a network. Another example of the output control software is software for controlling output to an external system, specifically, an application that controls output of data to a storage system or the like on a network, such as the Internet.

The device drivers include an in-box driver installed in an operating system (OS) and a driver that is additionally installed in an OS by a user (hereinafter, referred to as an out-box driver).

For example, a new printer on the market sometimes cannot be supported by an in-box driver installed in an existing OS. In such a case, using an out-box driver has been recommended. In contrast to the in-box driver, the out-box driver has a function for controlling a function unique to a corresponding device.

A known technique for using a function equivalent to an out-box driver corresponding to a new printer on the market using a driver installed in a client device is disclosed in PTL 1. PTL 1 discloses a technique for plugging a program for controlling a printer-unique function downloaded from the printer into a driver installed in a client device.

In recent years, the out-box driver or the technique disclosed in PTL 1 cannot sometimes be used depending on the kind of the OS. For example, Microsoft Windows™, which is an OS for tablet personal computers (hereinafter, referred to as tablet PCs), has a specification in which an out-box driver and a plug-in device driver cannot be installed. Under such an OS environment, there is a possibility that output control suitable for a new peripheral device on sale or output itself cannot be performed using an in-box driver of an OS.

CITATION LIST

Patent Literature

PTL 1: Japanese Patent Laid-Open No. 2007-200247

SUMMARY OF INVENTION

Accordingly, the present invention provides a technique for appropriately controlling output to an external system on a network with a plurality of pieces of cooperating software including existing output control software (for example, an in-box driver) even under such an OS environment.

An information processing apparatus according to an aspect of the present invention is an information processing apparatus that can execute an operating system that incorporates first output control software. The apparatus includes first control means configured to perform control to write data requested to be output by a user to a predetermined file via a port monitor as a function of the first output control software; acquisition means configured to acquire the data written to the predetermined file as a function of second output control software downloaded from an application management server and installed; and second control means configured to perform output control on the acquired data to an external system on a network as a function of the second output control software.

Further features of the present invention will become apparent from the following description of exemplary embodiments with reference to the attached drawings.

BRIEF DESCRIPTION OF DRAWINGS

FIG. 14A is a diagram for explaining setting information of a device driver in the second embodiment.

FIG. 14B is a diagram showing character string information in the second embodiment.

FIG. 14C is a diagram showing an example of a table that manages the setting information in the second embodiment.

DESCRIPTION OF EMBODIMENTS

A first embodiment of the present invention will be described hereinbelow with reference to the drawings.

Figure 1:
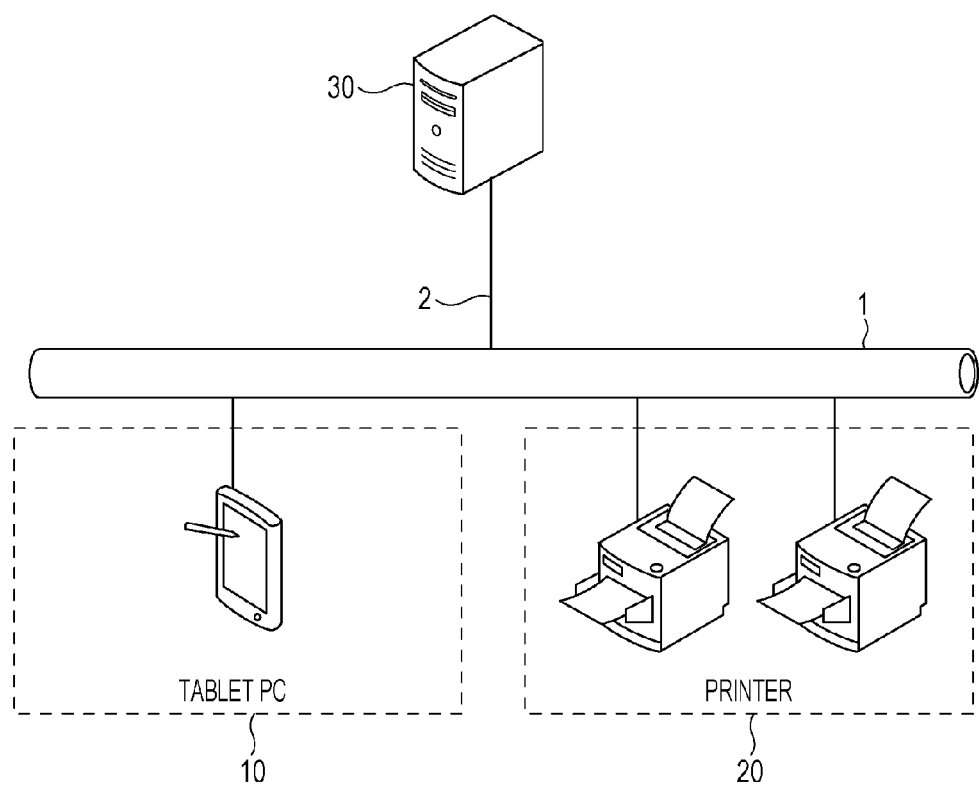
FIG. 1 is a diagram showing an example of a network configuration according to an embodiment of the present invention.

FIG. 1 is a diagram showing an example of a network configuration to which an output control system according to an embodiment of the present invention can be applied.

The entire network configuration includes a tablet PC 10, a printer 20, and an application management server 30 (hereinafter referred to as an app server 30), which are connected to be able to communicate with each other via a network 1.

Applicable examples of the network 1 include various connections, such as a wireless LAN, a wired LAN, and BlueTooth™. As shown in FIG. 1, the app server 30 may be disposed on the Internet 2 or the like. The printer 20 may include a plurality of printers.

In FIG. 1, the printers 20 are shown as output targets of output control software operating on the tablet PC 10. Alternatively, in addition to the printers 20, a scanner (not shown) on the network 1 and a storage server (not shown) on the Internet 2 may be the output targets of the output control software.

Figure 2:
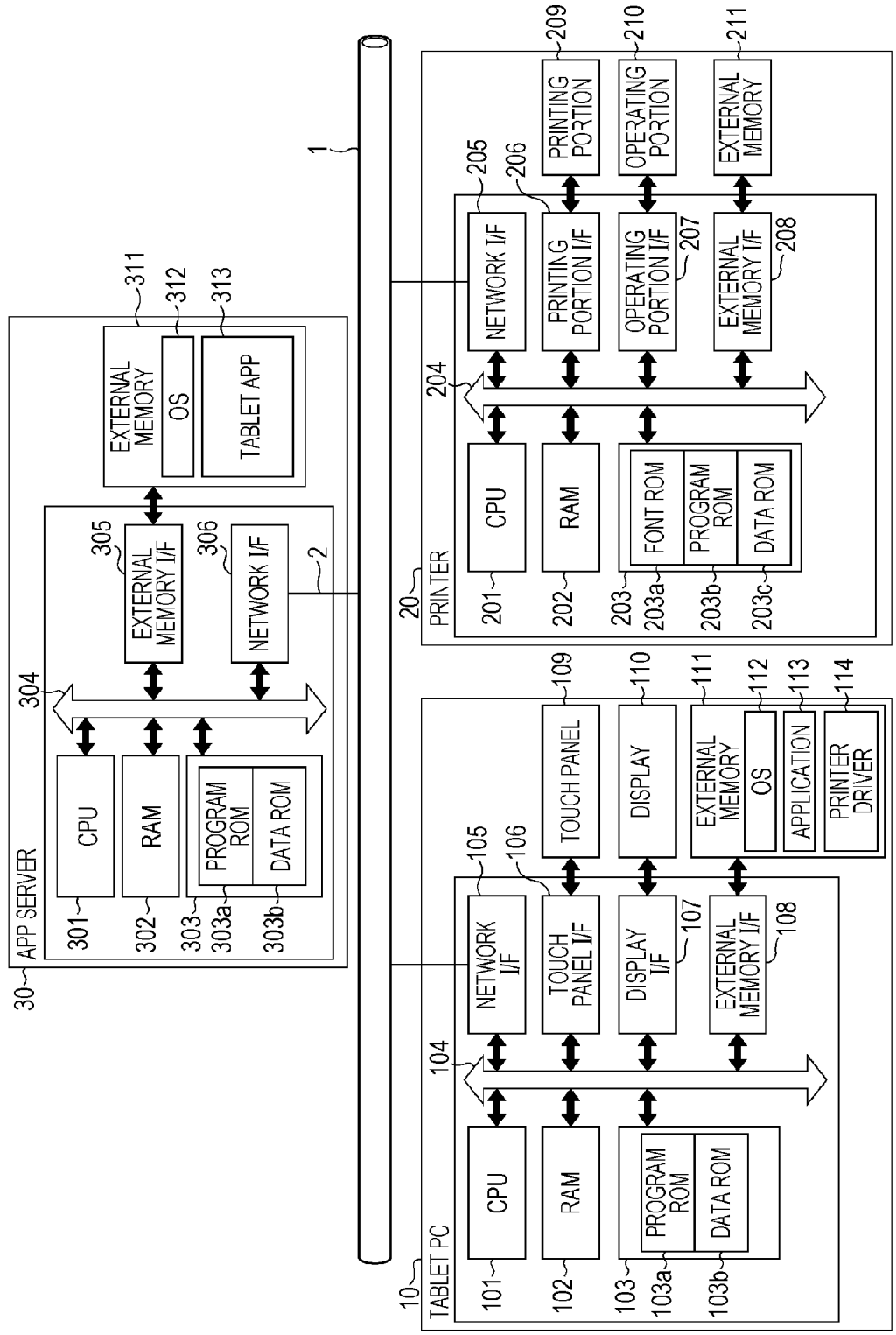
FIG. 2 is a block diagram showing an example hardware configuration of the apparatuses of the present invention.

FIG. 2 is a block diagram showing the hardware configuration of the apparatuses applicable to the present invention.

First, an information processing apparatus, such as the tablet PC 10, will be described. A CPU 101 controls devices connected to a system bus 104 as a whole in accordance with a program stored in a RAM 102. The tablet PC 10 may be controlled by a plurality of CPUs 101. The RAM 102 also functions as a main memory, a work area, and so on of the CPU 101. A ROM 103 stores various programs and data and is separated into a boot program ROM 103a that stores a boot program, a basic input/output system (BIOS), and so on and a data ROM 103b that stores various items of data.

A network I/F 105 is connected to the network 1 to perform communication processing. An input device I/F 106 controls input from an input device, such as a touch panel 109. The input device I/F 106 also controls input from a keyboard and a mouse (not shown). A display I/F 107 controls display processing on a display 110. An external memory I/F 108 controls access to an external memory 111, such as a flash solid-state drive (flash SSD). The external memory 111 stores an operating system (OS) 112 and various kinds of software. Examples of the software include an application 113 and a printer driver 114. The external memory 111 also stores a user file and an editing file (not shown).

This embodiment supposes that the OS 112 is an OS in which an out-box driver cannot be installed, although not limited to a specific kind of OS. However, the present invention can be applied to any OS in which a plurality of pieces of characteristic output control software of the present invention, to be described later. In other words, the present invention can also be applied to, in addition to the tablet PC 10 illustrated as an example of a client, apparatuses in which such an OS can operate, specifically, portable terminals, such as a smart phone and a notebook personal computer, and desktop PCs.

Next, the configuration of the printer 20 will be described. A CPU 201 controls devices connected to a system bus 204 as a whole in accordance with a program stored in a RAM 202. The RAM 202 functions as a main memory and a work area of the CPU 201 and also serves as an output-information developing area and an environment-data storage area. The RAM 202 also has a non-volatile RAM (NVRAM) area and is configured to increase in memory capacity with an optional RAM connected to an extension port (not shown). A ROM 203 includes a font ROM 203a that stores various fonts, a program ROM 203b that stores a control program and so on to be executed by the CPU 201, and a data ROM 203c that stores various items of data.

A network I/F 205 is connected to the network 1 to perform communication processing. A printing portion I/F 206 controls an interface with a printing portion 209 serving as a printer engine. An operating portion 210 controlled by an operating portion I/F 207 is provided with an operation panel that receives user operations, on which a switch, an LED display, and so on for operations are disposed (not shown). An external memory I/F 208 controls access to an external memory 211, such as a hard disk (HD). The external memory 211 stores font data, an emulation program, form data, and so on. The number of the external memory 211 is not limited to one but may be more than one; for example, a plurality of external memories that store an optional font card in addition to built-in fonts, a program for interpreting a printer control language in a different language system, and so on may be connected.

The CPU 201 can control communication with the tablet PC 10 via the network I/F 205 by executing the above control program. For example, the CPU 201 controls reception of print data transmitted from the tablet PC 10. The CPU 201 can output an image signal obtained by converting print data to the printing portion 209 via the printing portion I/F 206 on the basis of a control program or the like stored in the program ROM 203b of the ROM 203 to perform printing.

The app server 30 is a server for distributing an application that a user desires to the tablet PC 10 via the Internet 2. The configuration thereof is basically the same as that of the tablet PC 10 but stores applications to be distributed to an external memory 311. The app server 30 may have a configuration in which input/output devices, such as a display and a touch panel, are not needed.

The app server 30 may manage applications only for the OS operating on the tablet PC 10 to provide the service of distributing the applications to users who uses the OS. An example of output control software, to be described later, is an output control application (hereinafter, referred to as an output control app) for the OS provided by the app server 30. As described above, some OSs limit installation of an out-box driver, as those read from an external storage medium, depending on the kind and version thereof. Such OSs can download an application that the user desires from the app server 30 operating as a storage service for the OS and install it.

The output control app may provide a setting screen for the user to designate an individual function that an external system serving as an output target provides. For example, in the case where the external system is the printer 20, the printer 20 provides a color printing function, a bookbinding-layout setting function, a printing function in a special paper size, such as A3 or A2, an authentication function for implementing secure printing or user management, and so on. In the case where the external system is a storage system on the Internet 2, the storage system provides a storage-form setting function, a storage-period setting function, a publication-destination setting function, and so on.

The following embodiments will be described using an in-box driver (in particular, a printer driver), which is a device driver installed in the OS, and an application distributed from the app server 30 for controlling output to an external system on the network 1, as examples of a plurality of pieces of output control software operating on the client.

First Embodiment

Figure 3:
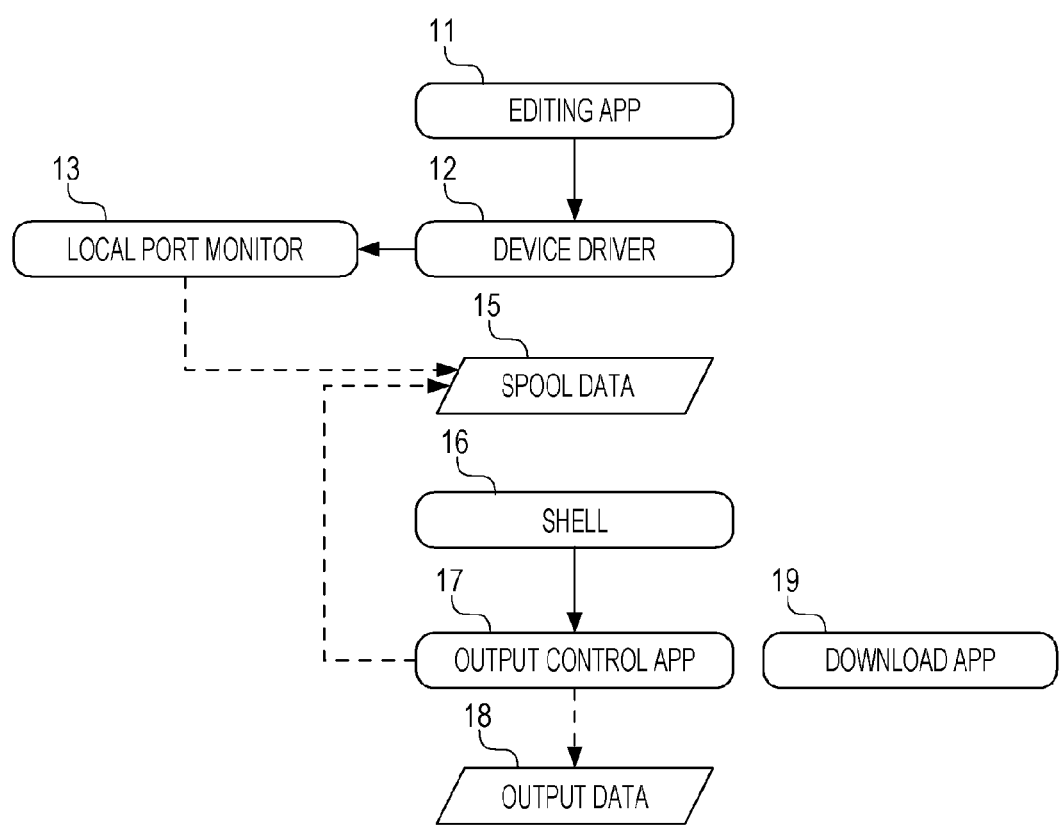
FIG. 3 is a diagram showing an example module configuration of software for an output control system in a first embodiment and the data flow thereof.

FIG. 3 is a diagram showing the module configuration of software for an output control system of the tablet PC 10 in a first embodiment and the data flow thereof.

An editing app 11 is a general application for users to make an output request, such as printing, for example, a web browser and document creation software. A device driver 12 is an in-box driver of the OS 112. The device driver 12 receives an output request from the editing app 11 as an instruction, converts the instruction to spool data 15, and outputs the spool data 15 to a local port monitor 13.

Although the following embodiments assume that the device driver 12 is an in-box driver, other software, such as an out-box driver having the same function and an application for controlling output corresponding thereto, may be used provided that the OS 112 does not limit installation of such software.

In the case where a printer driver is used as the device driver 12, the spool data 15 is in a printer language form. In the present invention, the spool data 15 is referred to as "spool data" so that it is distinguished from the output data of an output control app 17, described later, (for example PDL data).

The local port monitor 13 receives the spool data 15 from the device driver 12 and writes the spool data 15 into the external memory 211 as a file. A shell 16 is software having a user interface for starting various applications installed in the OS 112, opening a file, and executing a script.

The output control app 17 reads the spool data 15 and outputs output data 18 to the target system via the network 1. The output control app 17 converts the spool data 15 to data in a form suitable for the target system as needed and transmits the data to the outside using a predetermined communication system. The output control app 17 also has a user interface for selecting an output target from a plurality of candidates for the target system if present.

A download app 19 is software prepared to operate downloading of the output control app 17 from the app server 30.

Figure 4A:
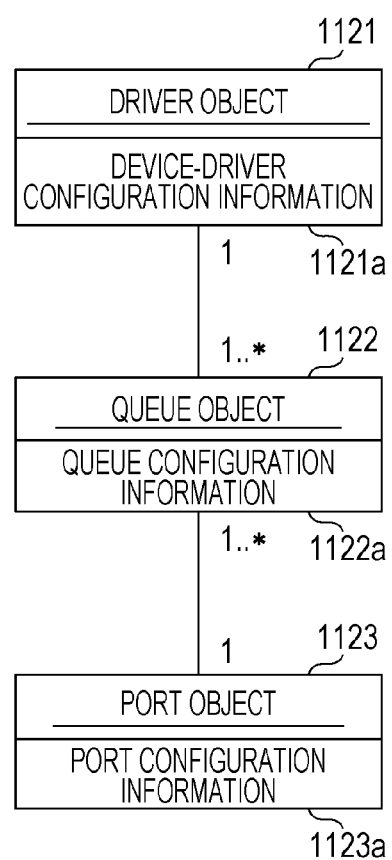
FIG. 4A is a diagram for explaining information on a driver object, a queue object, and a port object in an OS and the relationship among them.
Figure 4B:
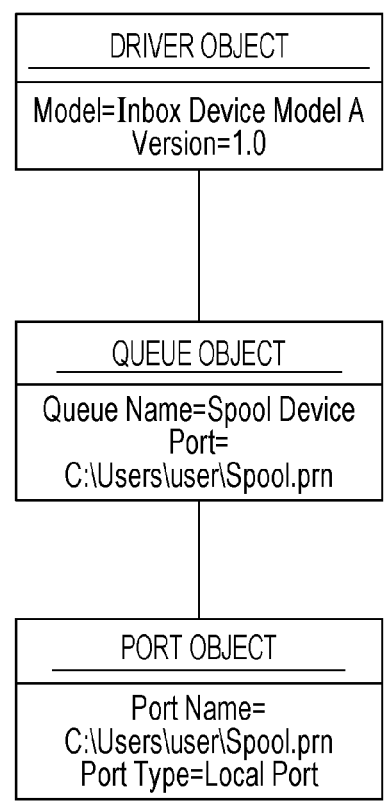
FIG. 4B is a diagram showing the objects in a unified modeling language (UML) according to the first embodiment of the present invention.
Figure 4C:
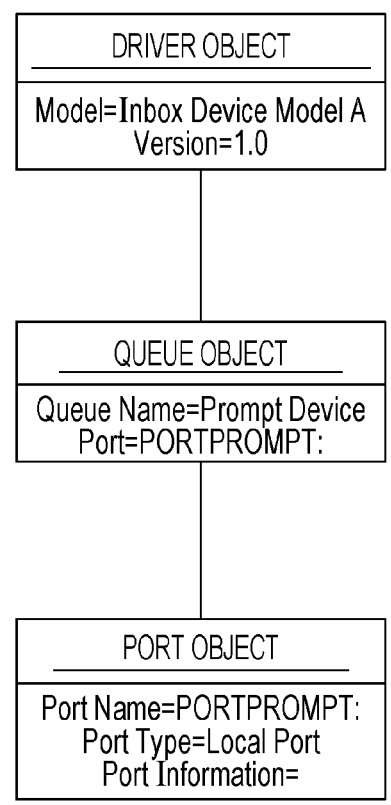
FIG. 4C is a diagram showing the objects in a unified modeling language (UML) according to a second embodiment of the present invention.

FIGS. 4A to 4C are diagrams for explaining information on a driver object, a queue object, and a port object in the OS 112 and the relationship among them. FIGS. 4B and 4C express the objects in a unified modeling language (UML).

As shown in FIG. 4A, the OS 112 according to the first embodiment of the present invention manages three items of information on a driver object 1121, a queue object 1122, and a port object 1123 to manage connection between the installed device driver 12 and the output system.

The driver object 1121 is a symbol corresponding to the installed device driver 12 and has device-driver configuration information 1121a. Since the driver object 1121 is managed model-by-model by the OS 112, the driver object 1121 differs depending on the model of the target system. The device-driver configuration information 1121a includes the model name and version of the device driver 12.

The queue object 1122 is a symbol corresponding to the output target and has queue configuration information 1122a. An output request of the user to a target system is fulfilled through the operation of designating the queue object 1122 from the editing app 11. Since the queue object 1122 is managed target-by-target by the OS 112, a plurality of output targets, if present, are managed by different objects even if the models or the services of the target systems are the same. The queue configuration information 1122a includes information on the queue name, the name of an associated device driver object, and the name of a port object.

A port object 1123 is a symbol corresponding to connection and has port configuration information 1123a. The port object 1123 is normally managed by the OS 112 on a one-to-one correspondence with the queue object 1122. In the Microsoft Windows™ OS, for example, connection, that is, the process of communication with a printer, is performed by a module called a port monitor. The port configuration information 1123a includes the port object name, port monitor type, and information on a designated port monitor (IP address and the name of a destination file).

Examples of the port monitor include a USB port monitor, a TCP/IP port monitor, and a WSD port monitor. Another example of the port monitor is a local port monitor for storing output data as a file in, not the actual output system on the external network, but the external memory 111. The present invention uses the local port monitor.

FIG. 4B shows an example setting of the device driver object 1121, the queue object 1122, and the port object 1123 of the output control system of the first embodiment.

In FIG. 4B, the device driver 12 is "Inbox Device Model A" in Version 1.0, which is an in-box driver, and a print queue, which is an output target of the device driver 12, is named "Spool Device". The associated port type is "Local Port" that designates the local port monitor 13, and port name/port information is "C:\Users\user\Spool.prn".

With this setting, data requested to be output by designating a queue "Spool Device" on a screen that the editing app 11 provides is stored in a user's document folder as the spool data 15 with a file name "Spool.prn". The user's document folder is a storage area for the user managed by the user using the OS 112 or the like.

FIGS. 5A to 5C and FIGS. 6A to 6C show examples of operation screens of the tablet PC 10. A method for setting up software that constitutes the output control system shown in FIG. 3 in the OS 112 will be described.

Figure 5A:
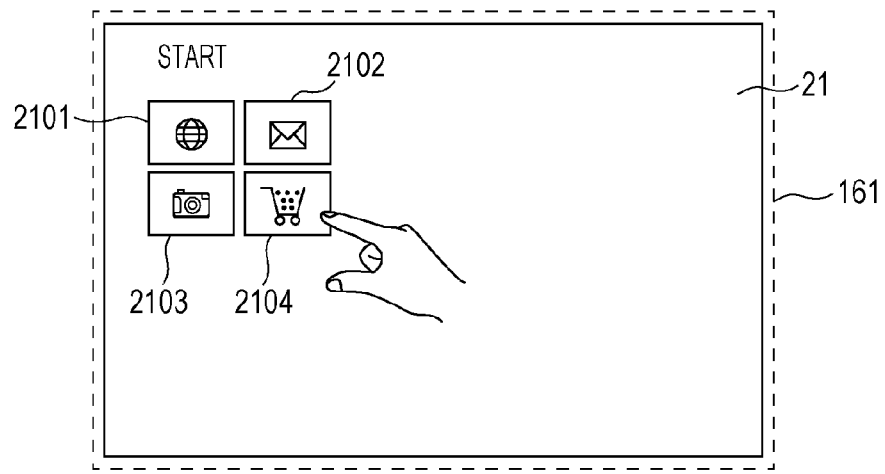
FIG. 5A is a diagram showing an example of an operation screen of a tablet PC.

FIG. 5A shows an example of a start screen 21 in a user interface (UI) environment 161 suitable for the touch panel 109 displayed by the shell 16. The UI environment 161 has an UI design that places emphasis on an operation on the touch panel 109, for example, a large menu display (tile-form display) such that a touch operation using a finger of the user or a pen is easy. The UI environment 161 also supports input using a mouse and a keyboard.

The start screen 21 has tiles 2101 to 2104. The tiles 2101 to 2104 are menu buttons for starting applications. The tile 2104 corresponds to the download app 19. When the tile 2104 is touched, the shell 16 starts the download app 19.

Figure 5B:
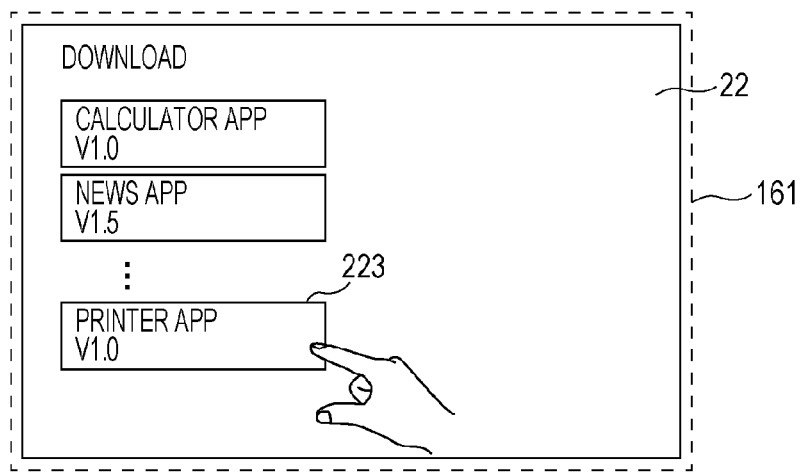
FIG. 5B is a diagram showing an example of an operation screen of the tablet PC.

FIG. 5B shows an example of a download screen 22 that the download app 19 provides. The download app 19 is an application that operates on the tablet PC 10 and communicates with the app server 30 via the network 1 and the Internet 2. The download app 19 obtains listed information on applications managed using the external memory 311 of the app server 30 and displays information, such as application name, in the form of tile on the download screen 22.

When a tile corresponding to a desired application among the list on the download screen 22 is touched by the user, the download app 19 downloads the application and installs application in the OS 112. In the first embodiment, when a tile 223 is touched, the download app 19 downloads a printer app, which is an example of the output control app 17, and installs the printer app.

Figure 5C:
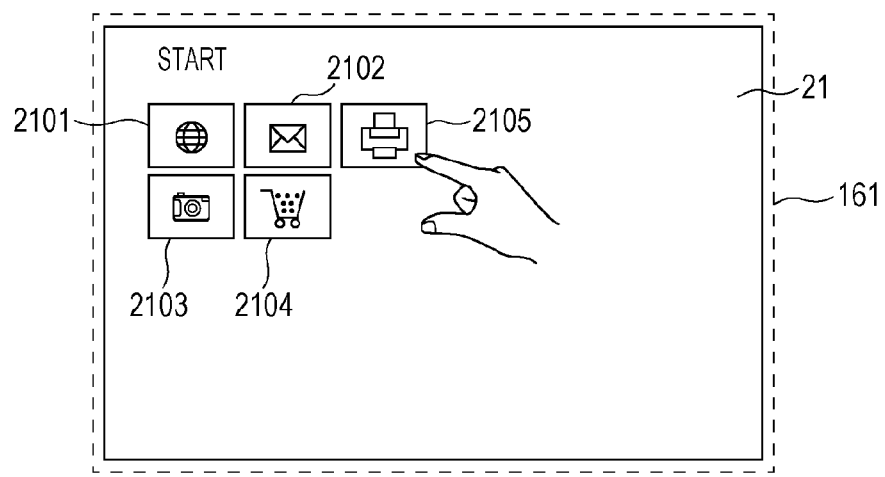
FIG. 5C is a diagram showing an example of an operation screen of the tablet PC.

FIG. 5C shows an example of the start screen 21 after the printer app, which is an example of the output control app 17, is installed.

When the printer app is installed, the shell 16 adds a tile 2105 corresponding to the printer app to the start screen 21. When the tile 2105 is touched by the user, the shell 16 starts the printer app.

Figure 6A:
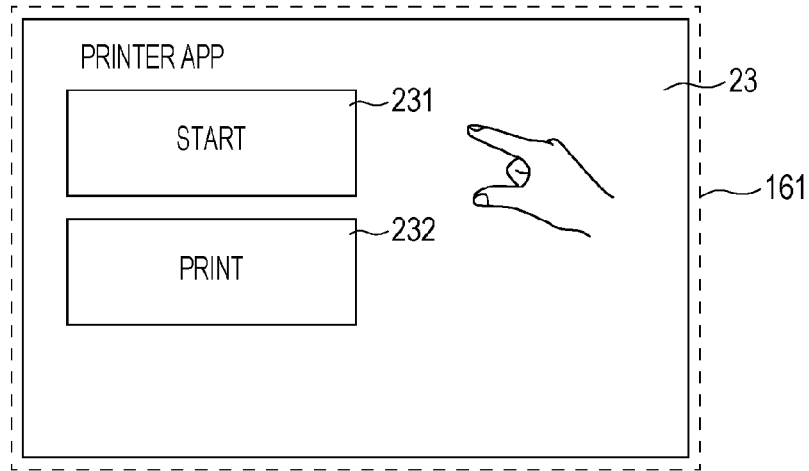
FIG. 6A is a diagram showing an example of an operation screen that a printer app, which is an example of an output control app, provides.
Figure 6B:
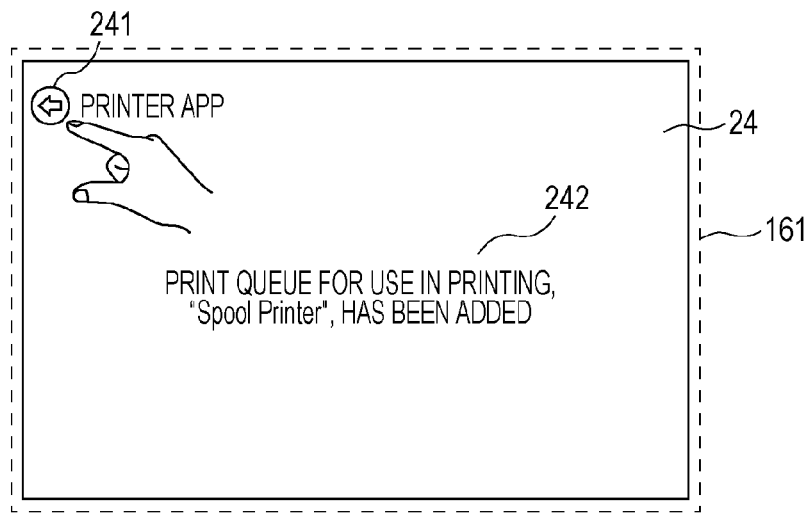
FIG. 6B is a diagram showing an example of an operation screen that the printer app provides.
Figure 6C:
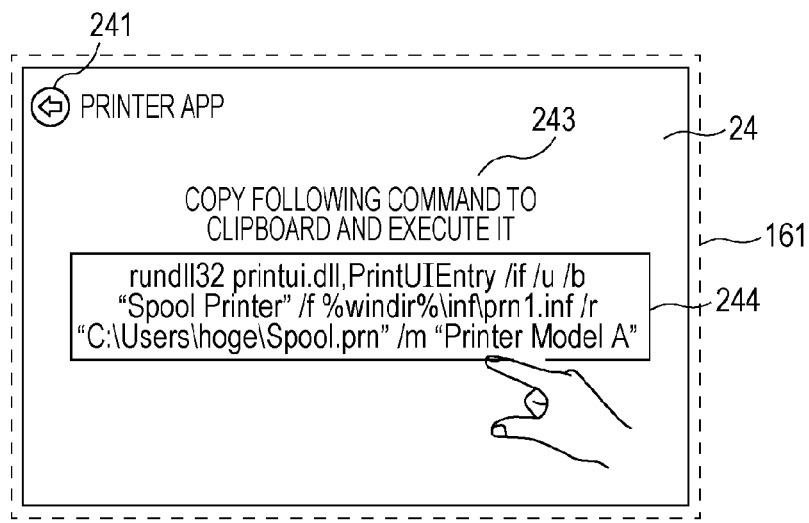
FIG. 6C is a diagram showing an example of an operation screen that the printer app provides.

FIGS. 6A to 6C show examples of operation screens that the printer app, which is an example of the output control app 17, provides.

FIG. 6A shows an example of a home screen 23 provided by the printer app. The home screen 23 displays tile menus 231 and 232 for calling individual functions. Here, when the tile 231 with an explanation "Start" is touched, the printer app displays a print-queue setting screen 24.

FIG. 6B shows an example of the print-queue setting screen 24. When the tile 231 is touched, the printer app executes a queue creation process shown in FIG. 7. In this process, the printer app creates a print queue as needed and controls the display of the print-queue setting screen 24.

Figure 7:
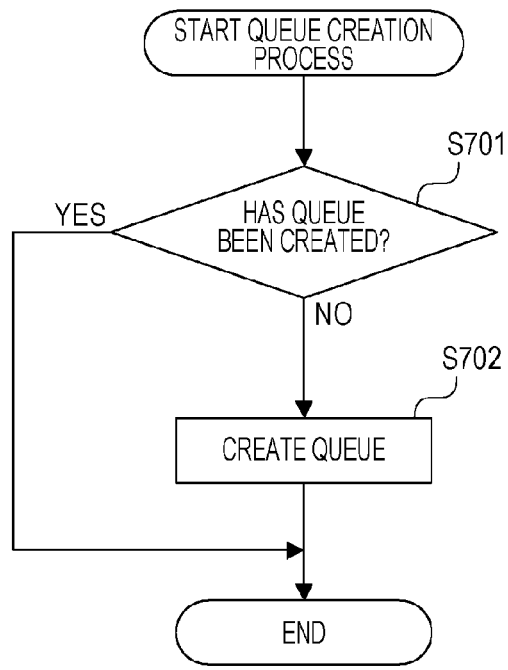
FIG. 7 is a flowchart for explaining a queue creation process that the output control application provides.

Referring to FIG. 7, the queue creation process that the output control app 17 provides will be described. The subject of the steps is the output control app 17. In S701, the output control app 17 determines whether a queue has been created and is managed by the OS 112. If it is determined in S701 that a queue has not been created, the output control app 17 creates a queue in S702. Specifically, the output control app 17 calls an API of the OS 112 provided to operate queue objects and registers a new queue object in the OS 112. Here, the queue object as shown in FIG. 4B is created.

If the API for operating queue objects is not available in S702 due to limitation of the OS 112 or the like, the printer app displays a message 243 and a text box 244 as shown in FIG. 6C. When the user copies the content of the script displayed in the text box 244 on a clipboard in accordance with the instruction of the message 243 and executes the command via a command line interface of the shell 16 or the like, a queue object is created. In other words, the printer app can prompt the user to create a queue object by displaying the message as shown in FIG. 6C.

In another method for creating a print queue object, the printer app may store the script file in the external memory 111 and displays a message to execute the script file, thereby prompting the user to execute the process.

When a back button 241 is touched on the display screen 24 shown in FIG. 6B or 6C, the printer app displays the home screen 23. Upon completion of the creation of the queue object, the user can return to the home screen 23 by touching the back button 241.

The display control shown in FIGS. 6A to 6C and the process shown in FIG. 7 are implemented by the CPU 101 executing the output control app 17.

Figure 8A:
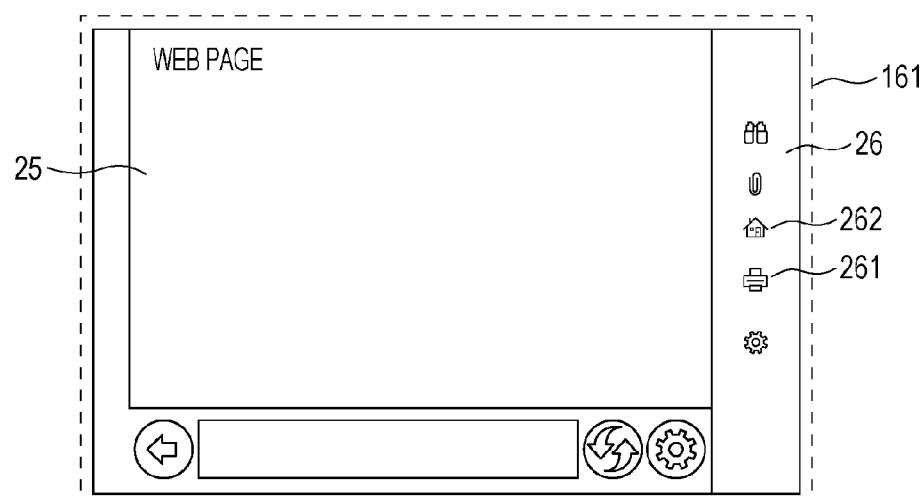
FIG. 8A is a diagram showing an example screen for explaining a printing operation of an editing app.
Figure 8B:
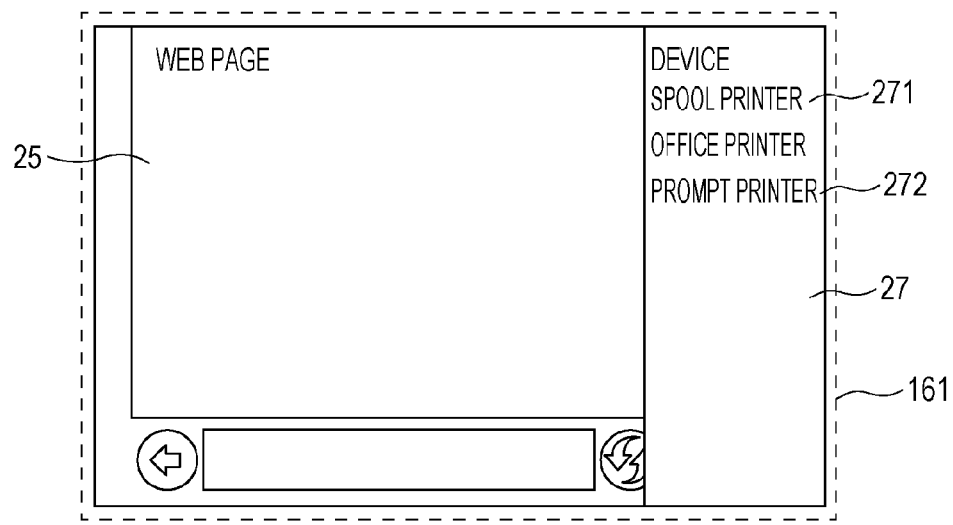
FIG. 8B is a diagram showing an example screen for explaining the printing operation of the editing app.
Figure 8C:
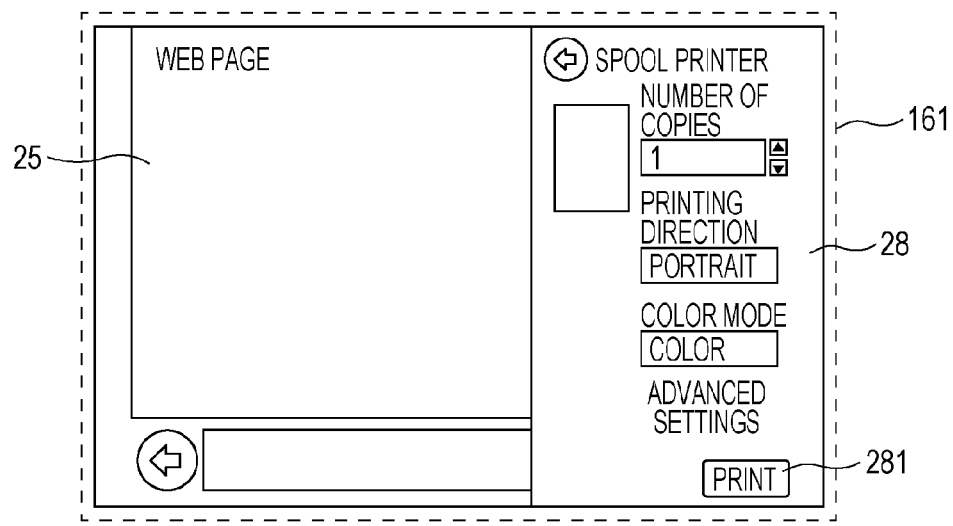
FIG. 8C is a diagram showing an example screen for explaining the printing operation of the editing app.

FIGS. 8A to 8C show example screens for explaining a printing operation of a user app, which is an example of the editing app 11. The user app in this case is a web browser. An operation for printing a Web page 25 displayed at present will be described.

FIG. 8A is a diagram showing a method for calling a printing function using the user app. When the user touches the right end of the screen and slides the finger inwards on the screen, the shell 16 displays an OS menu bar 26.

The OS menu bar 26 displays icons for calling various functions. When a print icon 261, which is one of the icons displayed on the OS menu bar 26, is touched by the user, the shell 16 displays a printer selection bar 27.

FIG. 8B shows an example screen of the printer selection bar 27. A name list of print queue objects set in the OS 112 is displayed on the printer selection bar 27 by the shell 16. When one of the names is touched by the user, the shell 16 determines a print queue object corresponding to the name as an output target and displays a print setting screen 28. Here, suppose that the name 271 of the print queue object of "Spool Printer" created in the process of FIG. 7 is selected by the user.

FIG. 8C shows an example of the print setting screen 28. The print setting screen 28 displays controls for print settings, such as the number of copies, printing direction, and color mode. When a print button 281 is touched, the user app issues a request to start printing.

Figure 9:
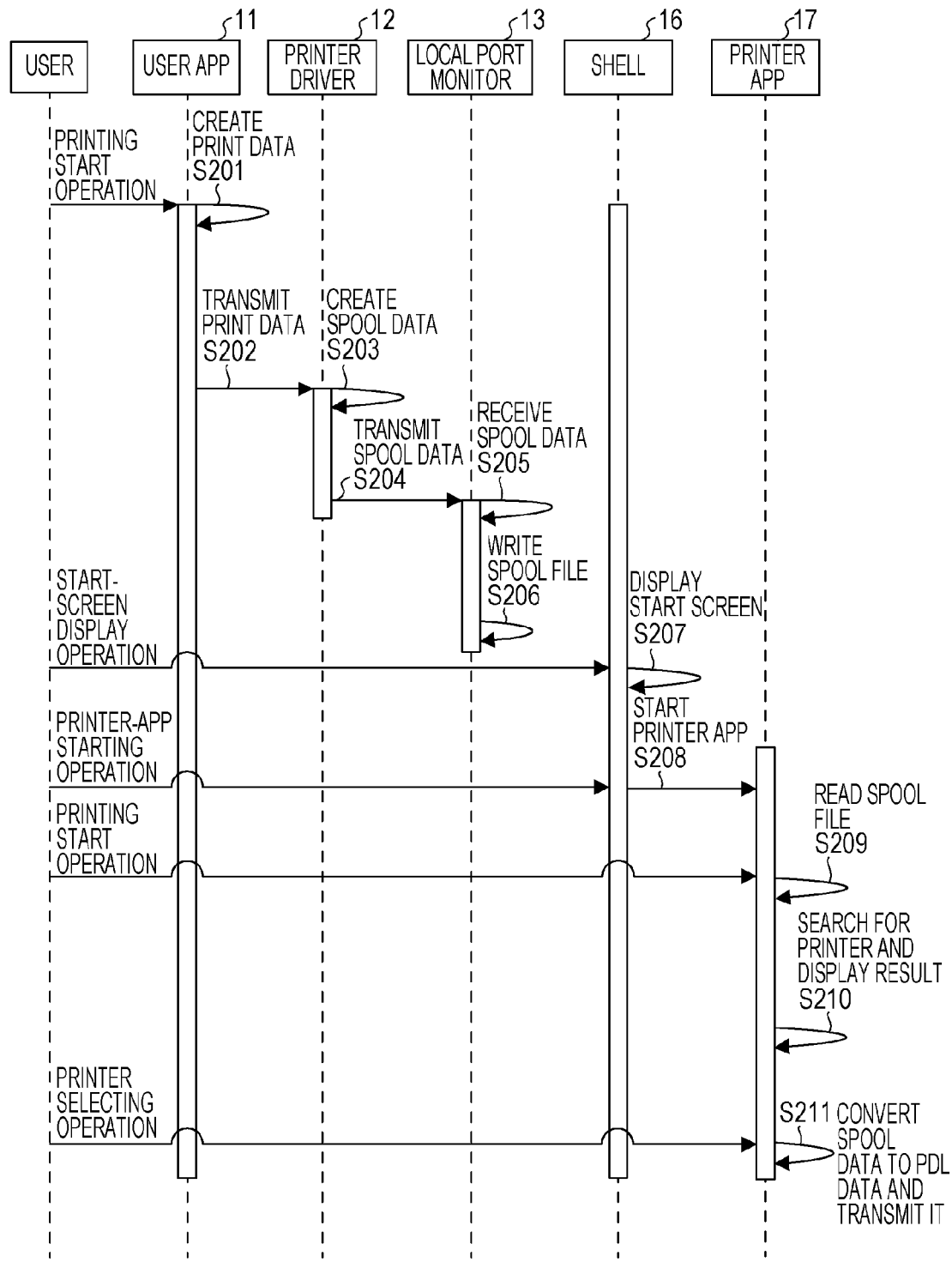
FIG. 9 is a sequence diagram for explaining the process of the output control system of the first embodiment.

FIG. 9 is a sequence diagram showing the process flow of the output control system of the first embodiment. Here, control of a printing output process using a printer driver, which is an in-box driver, and a printer app is described as a specific example.

In S201, when receiving a user operation to start printing, the user app, which is an example of the editing app 11, creates data to be printed. Here, the first embodiment assumes that the data to be printed is data in XML paper specification (XPS) format, for example. The XPS-format data can be created by converting data in HTML, which is the markup language of the Web page to be printed, via the API that the OS 112 provides. Next, in S202, the user app transmits the created data to the printer driver, which is an example of the device driver 12.

The printer driver converts the received data to the spool data 15 in S203 and transmits the spool data 15 to the local port monitor 13 in S204. The spool data 15 does not need to be PDL data compatible with a printer that the printer driver supports. In the first embodiment, since complete compatibility between the device driver 12 and the external system is not needed, the data format may be handled as intermediate data for inputting the data to the output control app 17 at the subsequent stage.

The local port monitor 13 receives the spool data 15 from the printer driver in S205 and writes the spool data 15 to the external memory 111 as a spool file in S206. The path to the file to be written is "C:\Users\user\Spool.prn" included in the port object information set in the queue-object creation process performed by the printer app (FIG. 7).

When the spool file is written to the external memory 111, next the user operates the touch UI (UI environment) 161 to display the start screen 21 and starts the printer app.

In S207, when a start icon 262 on the OS menu bar 26 in FIG. 8A is touched by the user, the shell 16 displays the start screen 21. In S208, the shell 16 starts the printer app, which is an example of the output control app 17, in response to a touch on the tile 2105.

In S209, the tile 232 on which "Print" is written is touched on the home screen 23 provided by the printer app, the printer app reads the spool data 15 from the spool file. Next, in S210, the printer app performs the process of searching for the printer 20, which is a target system, via the network I/F 105. The printer app displays the search result on a target-device selection screen 29.

The search process here refers to communication with an output system, such as one or more printers, connected to the network 1 to obtain information on the IP addresses, names, and installation sites thereof. Examples of means for communication include known Simple Network Management Protocol (SNMP) and Web Services on Devices (WSD) protocol. Since it is generally impossible to determine the state of the external system in advance, that is, whether the power is on and the external system is connected to the network 1, the printer app tries to communicate with the external system every search process. For searching, means called broadcast is used for the network 1. When the printer app transmits a request to obtain SNMP information via the network I/F 105 using the broadcast, all external systems that can be reached via the network 1 respond.

An external system that provides a specific storage service present on the Internet 2 or the like may be displayed on the target-device selection screen 29. In this case, one or more external systems that the OS or the output control app 17 manages in advance are displayed on the target-device selection screen 29. An output system connected to the network 1 and one or more external systems present on the Internet 2 can also be displayed on the target-device selection screen 29.

In S211, the printer app controls output of output data corresponding to the spool data 15 to the printer selected on the target-device selection screen 29.

Examples of the output control here include the process of converting the spool data 15 to PDL data 18 and the process of transmitting the data 18 to the selected printer. The PDL data 18 is compatible with the selected printer 20. Another example of the output control is the process of transferring the spool data 15 to the external system as a file.

Figure 10A:
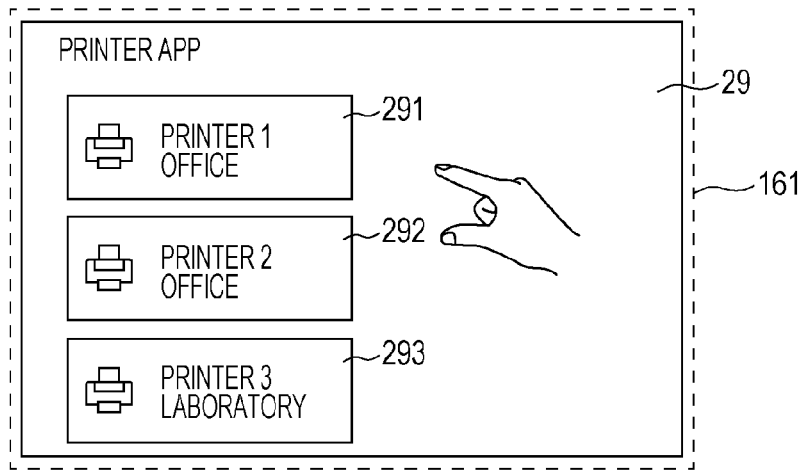
FIG. 10A is a diagram showing an example of a target-device selection screen that a printer app provides.
Figure 10B:
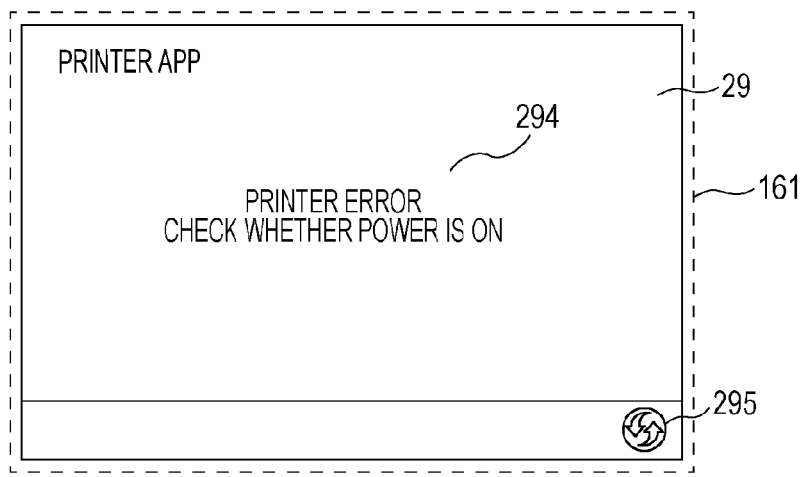
FIG. 10B is a diagram showing an example of the target-device selection screen.
Figure 10C:
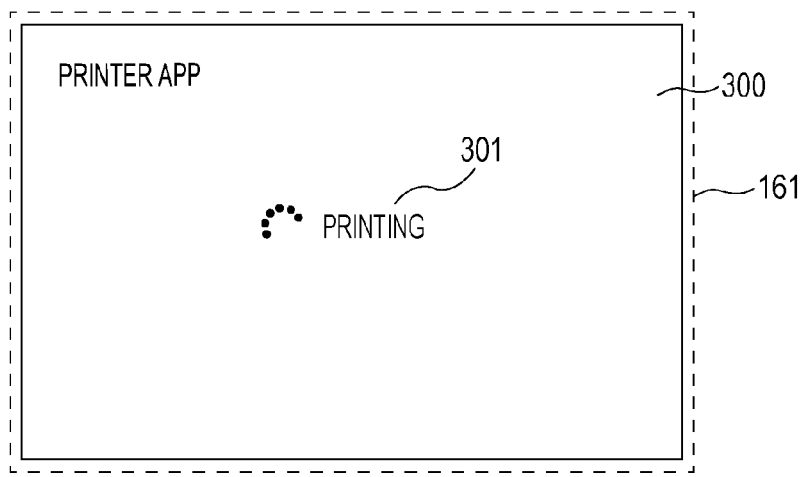
FIG. 10C is a diagram showing an example of screens that the printer app provides.

Referring to FIGS. 10A to 10C, screen transition until an output target is determined by the printer app will be described.

FIG. 10A shows an example of the target-device selection screen 29. The target-device selection screen 29 displays a list of printers available as output targets, such as tiles 291, 292, and 293. If the user cannot establish communications for the reason that, for example, the user forgot to turn on the power of the printers, so that there is no available printer, a screen shown in FIG. 10B is displayed, for example.

A message 294 in FIG. 10B presents a notification that the search process has failed. When a button 295 displayed at the lower part of the screen 29 is touched by the user, the printer app tries the search process (S210) again. During output control, such as PDL conversion or transmission (S211), a screen 300 as shown in FIG. 10C is displayed, in which a message 301 that printing is being executed or have been completed is displayed.

As described in the first embodiment, control of data output to an external system using two pieces of output control software including the in-box driver is implemented.

Second Embodiment

Next, a second embodiment of the present invention will be described. For the second embodiment, differences from the first embodiment will be described.

In the first embodiment, the user performs five times of operation in total to execute the steps of S201, S207, S208, S209, and S211. In contrast, in the second embodiment, output control is performed with a smaller number of operations than that of the first embodiment.

Figure 11:
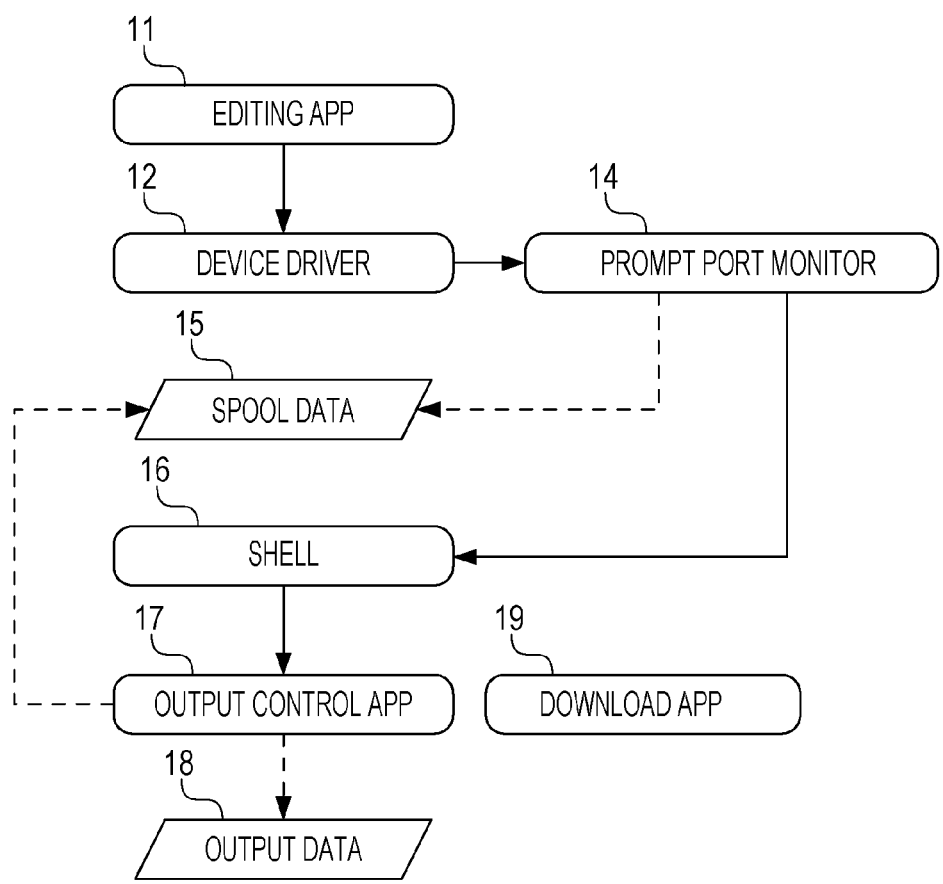
FIG. 11 is a diagram showing the module configuration of software for an output control system in a second embodiment of the present invention and the data flow thereof.

FIG. 11 is a diagram showing the module configuration of software for an output control system of the tablet PC 10 in the second embodiment and the data flow thereof. The second embodiment adopts a prompt port monitor 14 instead of the local port monitor 13. The details of the settings of a print queue object created in the second embodiment are shown in FIG. 4C. Differences in process from the first embodiment will be described using FIG. 11.

The prompt port monitor 14 is a type of port monitor that stores the spool data 15 received from the device driver 12 as a file, as the local port monitor 13 does. The prompt port monitor 14 has the function of controlling the display of a notification screen (GUI) called a toast via the shell 16.

The other processes are similar to those described with reference to FIG. 3 in the first embodiment, such as the process of controlling the output of the spool data 15 as output data by the output control app 17.

Figure 12:
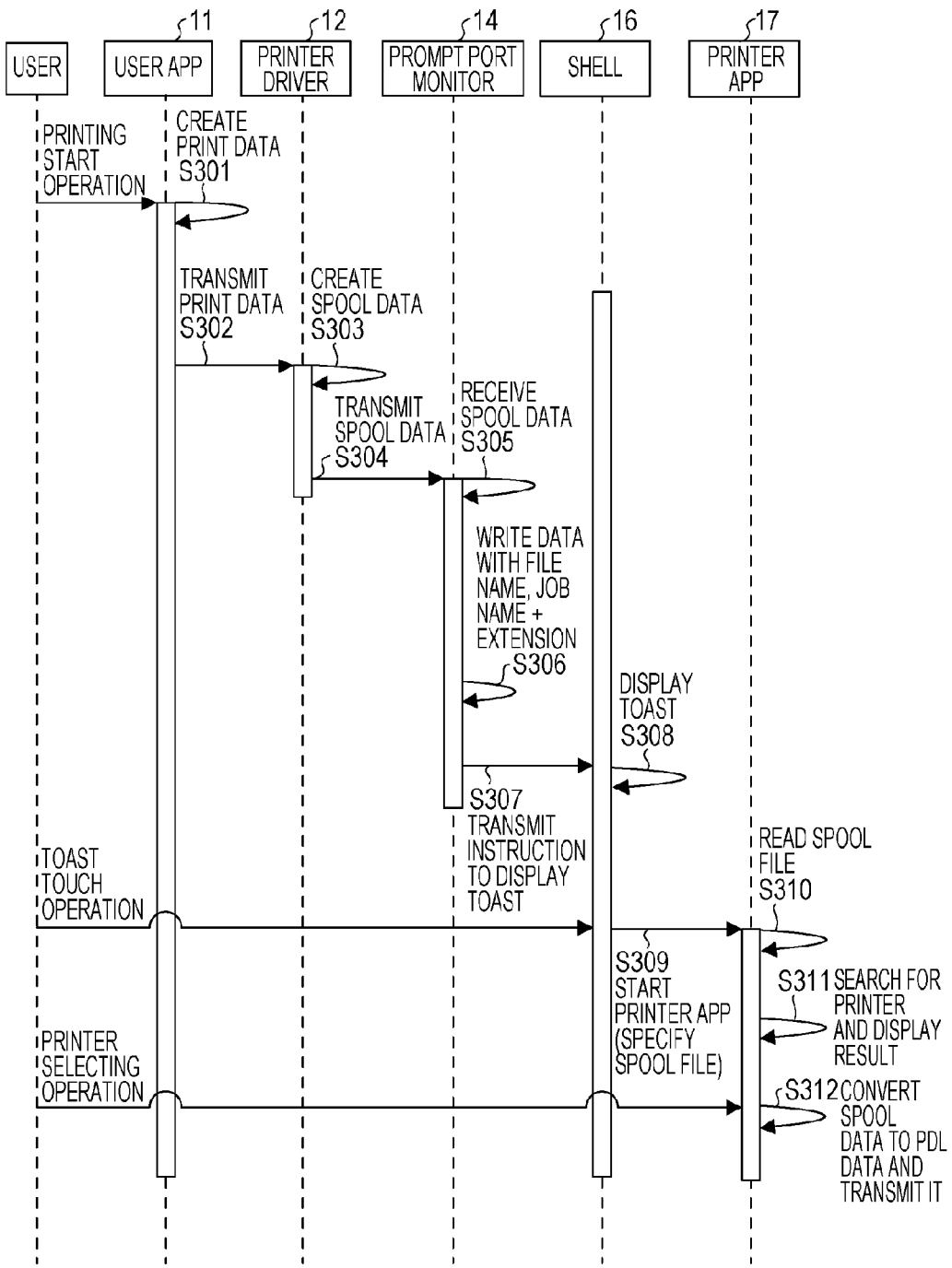
FIG. 12 is a sequence diagram for explaining the process of the output control system in the second embodiment.

FIG. 12 is a sequence diagram showing the flow of the printing process of the output control system in the second embodiment. Since the steps from S301 to S304 in FIG. 12 are the same as the steps from S201 to S204 of the first embodiment in FIG. 9, descriptions thereof will be omitted.

In S305, the prompt port monitor 14 receives the spool data 15. In S306, the prompt port monitor 14 creates a file with a file name using attribute information, such as the document name of the target data requested to be output by the user app and extension and writes the content of the spool data 15 to a document folder of the user. Here, the name of the created file is "print job name.extension" using "print job name" given when the printer driver created the spool data 15.

In the first embodiment, the local port monitor 13 writes the spool data 15 to a file in a predetermined file path. In contrast, in the second embodiment, the prompt port monitor 14 writes the spool data 15 after creating a file with a file name that is appropriately determined using attribute information on target data, such as document name, on a predetermined file path. Therefore, using the prompt port monitor 14 creates different spool files depending on the attribute information on the target data. Here, the attribute information includes at least one of the document name, job name, and date information, described above.

For example, if job name is "WEB page", spool file name is "WEB page.prn". Although ".prn" is an extension that the prompt port monitor 14 gives by default, a different extension may be given.

FIG. 14A is a diagram in which a portion concerning specification of an extension is extracted from the setting file of the device driver 12. In the settings of the device driver 12, a value "123" is assigned to a key ".printapp" in the section "FileSave". With this setting, the extension of the spool file that the device driver 12 outputs via the prompt port monitor 14 becomes ".printapp", not the default extension. The extension of the setting file of the device driver 12 is designated in advance when the vendor of the device driver 12 installs the device driver 12 in the OS 112. In other words, the extension of the setting file of the device driver 12 can be an extension that is not the same as other extensions by the intention of the vendor.

Here, the assigned value "123" in FIG. 14A is a resource ID in the character string resource of the device driver 12. FIG. 14B shows an example of the character string resource of a printer driver. The character string resource is in a data format in which a resource ID and a character string are combined. In the example of FIG. 14B, a character string corresponding to the resource ID of the value "123" is "printer app file". How the character string identified by the resource ID is used in the setting file in FIG. 14A will be described later.

In S307, the prompt port monitor 14 transmits a toast display instruction to the shell 16 after writing the spool data 15.

Figure 13A:
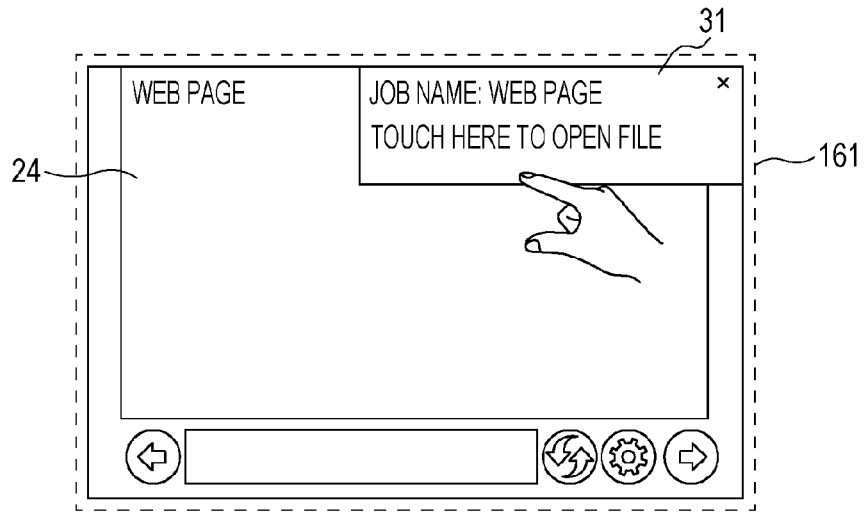
FIG. 13A is a diagram showing an example screen including a toast in the second or third embodiment.
Figure 13B:
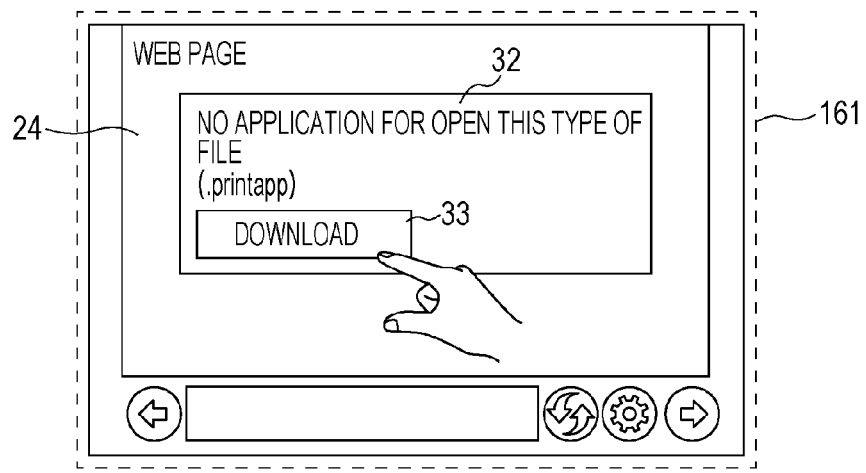
FIG. 13B is a diagram showing an example screen including a toast in the second or third embodiment.
Figure 13C:
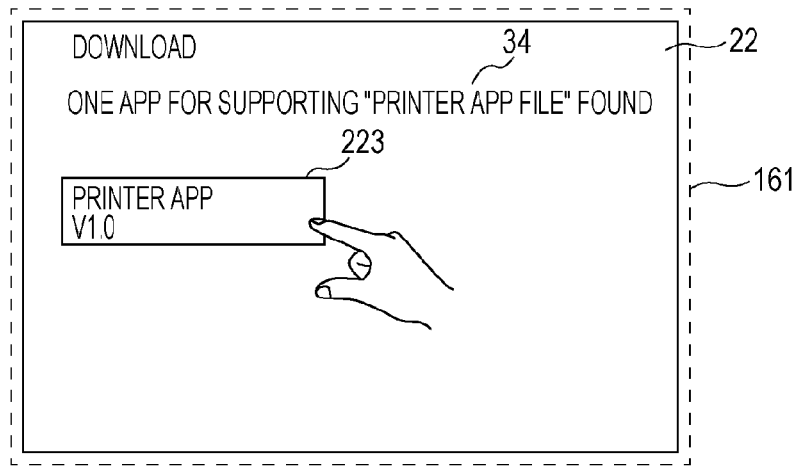
FIG. 13C is a diagram showing an example screen including a toast in the second or third embodiment.

In S308, upon reception of the display instruction, the shell 16 displays a toast on the touch UI 161. FIGS. 13A to 13C show example screens when the shell 16 controls display including a toast.

FIG. 13A shows an example of a toast 31 displayed at the upper right of the screen 24 of the user app. The toast 31 is a GUI for displaying a message and is a message screen provided using, not output control software, but a function of the OS 112.

The toast 31 is a message screen provided to the user after the user issues a print request using the user app. The toast 31 presents information so that the user can ascertain the target of the print request, such as the above-described job name, providing the user with guidance on the next operation. The toast 31 serves also as a tile for calling a desired function and displays a message that prompts the user to touch the toast 31.

In S309, the shell 16 designates a path to the spool file as a startup option in response to a user's touch on the toast 31 to start a printer app. This allows the printer app to receive the file path to the spool file designated as a startup option at the startup.

In S310, the printer app reads the content of the spool file in the path designated as a startup option.

Among various applications installed in the OS 112, the printer app is started by the shell 16 due to the association of the extension. FIG. 14C shows an example of a table that manages information in which extensions that the OS 112 manages and applications corresponding to the extensions are associated. The shell 16 can find an application associated with an extension by referring to the table, and thus, the shell 16 can start a desired application by designating a file path as a startup option. The name and extension of an additional output control application are registered to the table in FIG. 14C at the installation of the application.

Since the steps from S311 to S312 in FIG. 12 are the same as the steps from S210 to S211 in FIG. 9 of the first embodiment, descriptions thereof will be omitted.

In the second embodiment, the use of the prompt port monitor 14 can reduce the number of user operations for output control to three, that is, the operation of a print request to the user app, touching on the toast 31, and designation of an output target by the printer app.

Since the toast 31 disappears from the screen 24 after a fixed time, the toast 31 may disappear before the user touches it. In such a case, another means may be used to read the spool data 15 with the printer app. For example, by the user opening the spool file stored in a document folder of the user from a file management application or the like, an associated application in the table shown in FIG. 14C can be started. Furthermore, a system for reading a spool file stored in a document folder of the user using a file opening function at the start of the output control application 17 may be installed in the output control app 17.

Third Embodiment

Next, a third embodiment of the present invention will be described. For the third embodiment, differences from the first and second embodiments will be described.

In the second embodiment, the system is set up in the order that after the output control application 17 is downloaded and installed and then the queue object of the device driver 12 is created. Alternatively, the order of set-up can be changed by using the table shown in FIG. 14C.

In other words, the third embodiment allows the system to be set up in the order that after a queue object is created, the output control application 17 is installed. The third embodiment supposes that the user creates a queue object after obtaining information on the order of creation of the queue object from the Website of a manufacturer of the device driver 12.

Specific methods for the creation include allowing an install script file to be downloaded in the PC of the user and displaying a script on a Web page to prompt the user to copy the script to a clipboard. Alternatively, an administrator other than the user of the tablet PC 10 may execute an administrative operation for automating the creation of a print queue object without troubling the user via the network 1.

After the queue object is created on the tablet PC 10 of the user, the user performs printing operation with the editing app 11.

In the third embodiment, the steps from S301 to S308 that are performed in response to the printing operation of the user are the same as those in the second embodiment. However, even if the toast 31 is touched, the extension ".printapp" is not registered in the table shown in FIG. 14C, and the printer app is also not installed.

In the case where the extension of the spool file is not registered in the table shown in FIG. 14C, the shell 16 displays the screen 22 shown in FIG. 13B, for example.

In FIG. 13B, a message box 32 gives a message to the user that an application associated with the desired file is not administered by the OS 112. Here, when the user touches a button 33 disposed at the lower part of the message box 32, the shell 16 starts the download app 19. The download app 19 provides the function of searching the app server 30 for an application associated with the extension ".printapp". With the function of the download app 19, the tablet PC 10 communicates with the app server 30 and displays the search result on the application associated with the extension ".printapp" (FIG. 13C).

FIG. 13C shows an example screen of the search result on the application. A message 34 displays information on the number of search results and so on. FIG. 14B shows character string information, "printer app file" as the information on the message 34. As described above, the character string included in the resource in FIG. 14B is used as information describing a file type that the extension represents.

When the user touches a tile 223 corresponding to a printer-app set up instruction, displayed as the search result, the printer app is downloaded and installed. After completion of the installation, the steps from S310 to S312 shown in FIG. 12 are executed.

Fourth Embodiment

Next, a fourth embodiment of the present invention will be described. For the fourth embodiment, differences from the first to three embodiments will be described.

In the above embodiments, the user needs to perform the operation of selecting a tile corresponding to a target external system when the output control app 17 executes the process of data output control (S211 and S312). However, for example, in the case where a certain external system, such as a printer, is usually used, it is redundant to select an output target every time a print request is given.

Accordingly, the screen shown in FIG. 10A may be displayed not at the time of output but at the time the output control app 17 is started to call the function of setting an output target. Specifically, this can be achieved by adding a new tile on the screen 23 in FIG. 6A that the printer app, which is an example of the output control app 17, provides to call an output-target setting function. A suitable example of words displayed on the tile at that time is "Set output target". When this tile is touched by the user, the printer app performs a process for searching for a target external system (here, a printer) and displaying the output target and displays the screen 29 shown in FIG. 10A.

In the fourth embodiment, an output target selected via the output-target setting function that the output control app 17 provides is set as a prescribed output target of the output control app 17. Unless the user calls the output-target setting function and changes the output target intentionally, the output control app 17 performs output control on the prescribed output target.

In the fourth embodiment, the process of output control on an external system will be described in detail.

Figure 15:
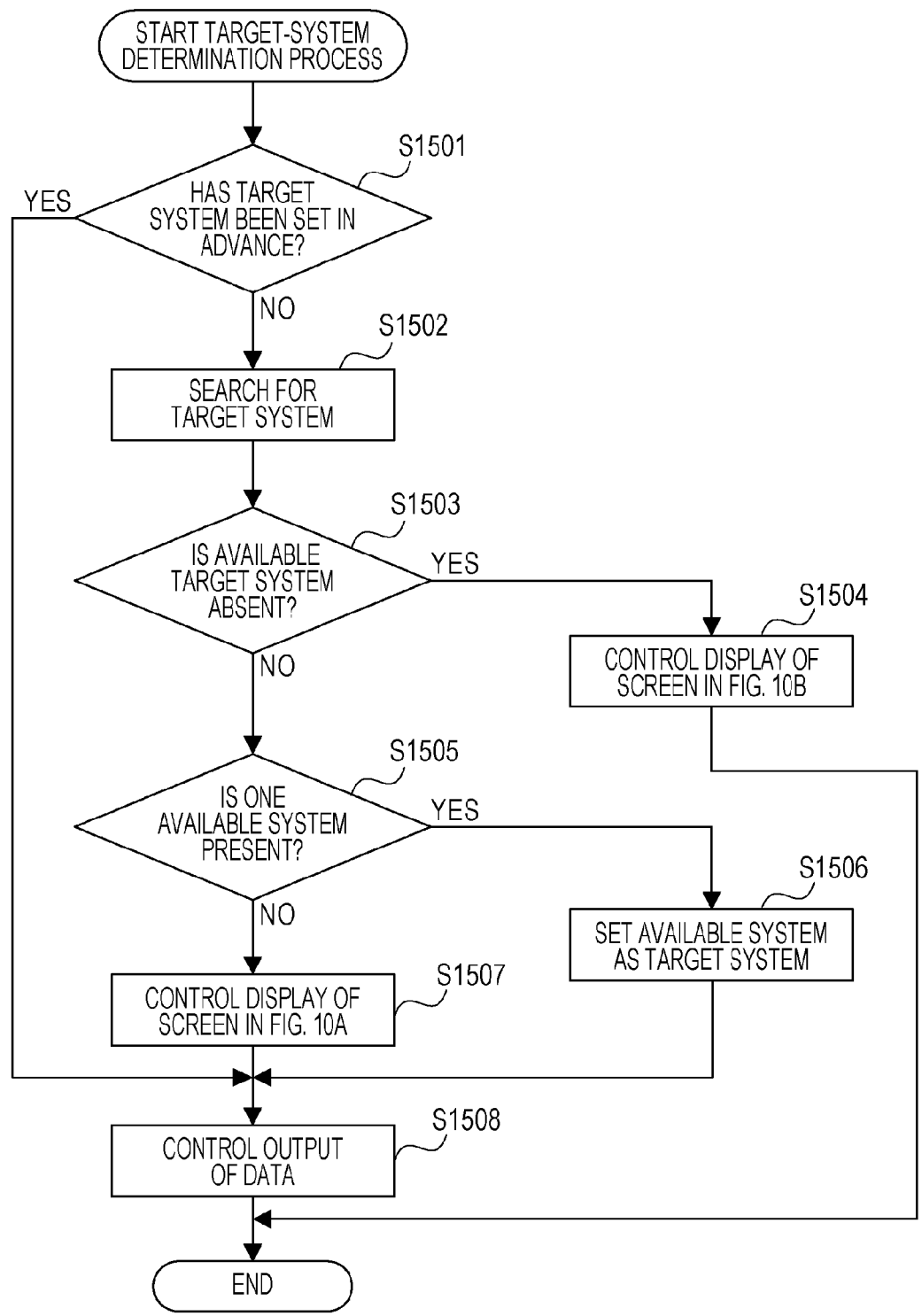
FIG. 15 is a flowchart for explaining an output-target setting process provided by an output control app in a fourth embodiment.

FIG. 15 is a flowchart for explaining the output-target setting process implemented by executing the output control app 17 in the fourth embodiment. This process is provided as an alternative to the steps from S210 to S211 in FIG. 9 or the steps from S311 to S312 in FIG. 12.

In S1501, the printer app, which is an example of the output control app 17, determines whether an output target has been set in advance. If Yes, the process moves to S1508, and if No, the process moves to S1502. In S1502, the printer app searches for a target system or a printer on the network 1. In S1503, the printer app determines whether an available printer is present as the result of the search process. Here, if an available target system is absent (0), the process moves to S1504, and if an available target system is present, the process moves to S1505. In S1504, the printer app controls the display on the screen 29 shown in FIG. 10B to terminate the process.

In S1505, the printer app determines whether the number of available printers is one. If one output target is found, the printer app sets the printer as an output target in S1506. If a plurality of available output target candidates are found, the printer app controls the display on the screen 29 in FIG. 10A in S1507 to prompt the user to designate an output target system on the screen 29.

In S1508, the printer app performs data output control on the output target determined in the above steps and terminates the process.

Fifth Embodiment

Next, a fifth embodiment of the present invention will be described. For the fifth embodiment, differences from the first to fourth embodiments will be described.

In the first to fourth embodiments, the user needs to operate the output control app 17 or the toast 31 when reading the spool data 15. In the fifth embodiment, a system for omitting this operation will be described.

Figure 16:
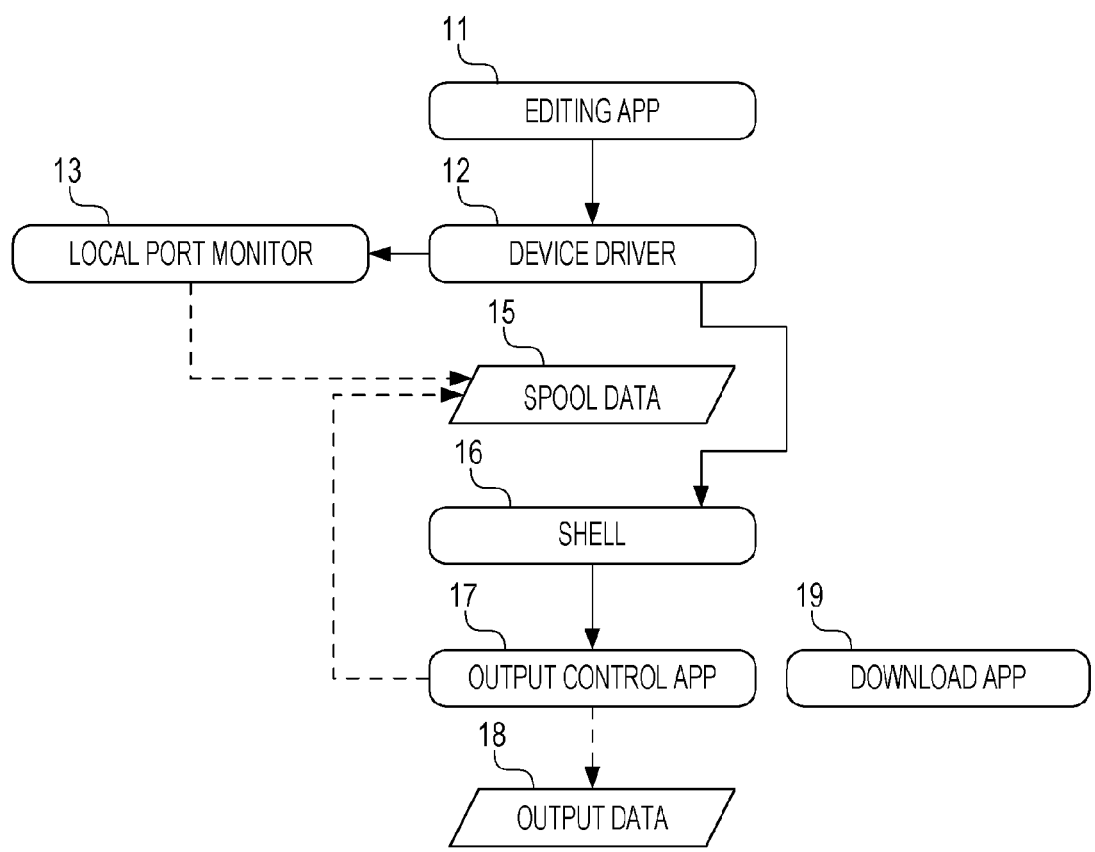
FIG. 16 is a diagram showing the module configuration of software for an output control system of in a fifth embodiment.

FIG. 16 is a diagram showing the module configuration of software for an output control system of the tablet PC 10 in the fifth embodiment and the data flow thereof.

The fifth embodiment is configured such that the device driver 12 directly calls the shell 16. The fifth embodiment uses the local port monitor 13 as a port monitor. However, unlike the first embodiment, the file path through which the local port monitor 13 is output includes an extension associated with the output control app 17. An example of the file path is "C:\Users\user\Spool.printapp".

Figure 17:
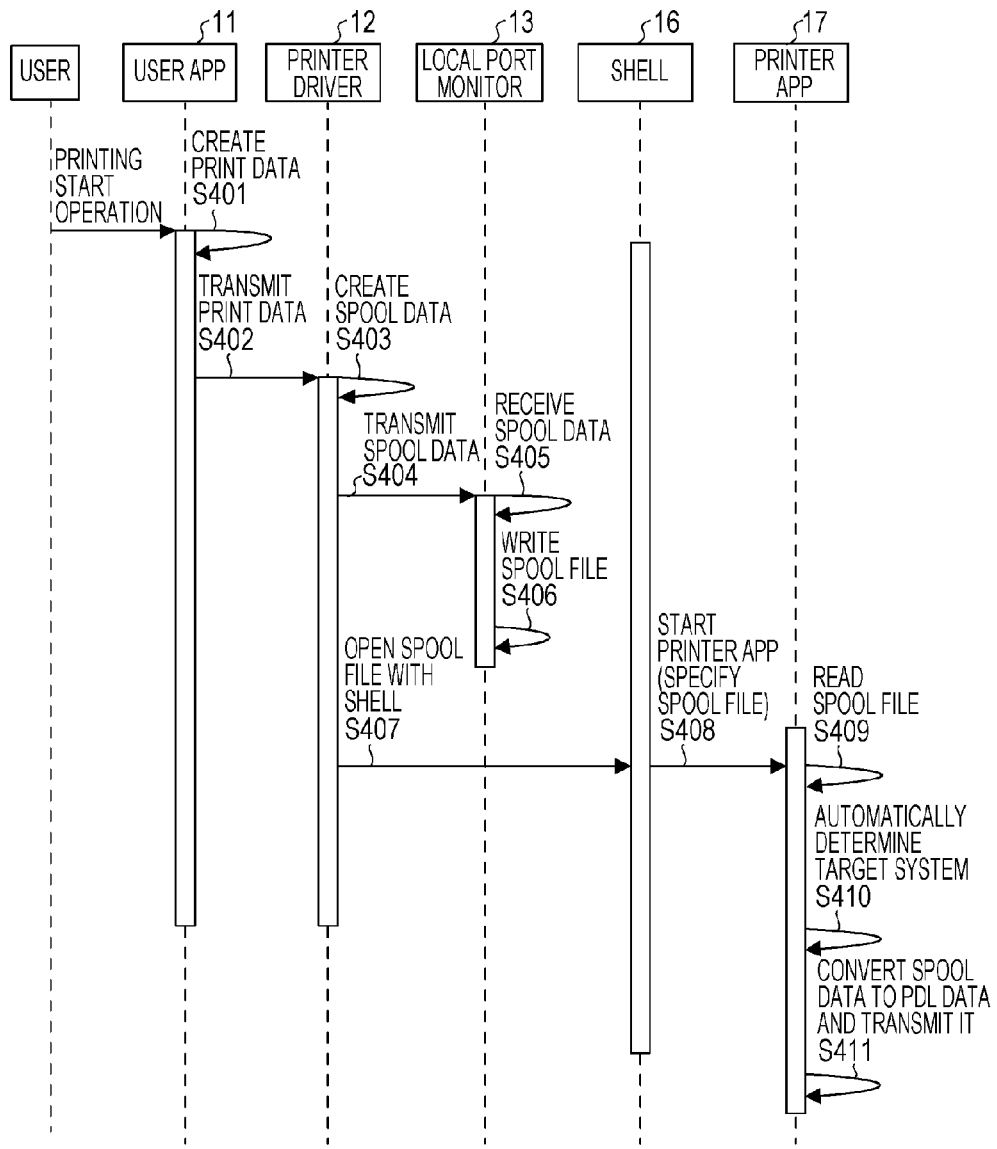
FIG. 17 is a sequence diagram showing the process of the output control system of the fifth embodiment.

FIG. 17 is a sequence diagram showing the flow of a printing process of the output control system of the fifth embodiment. Since steps from S401 to S406 of this process are the same as the steps from S201 to S206 in FIG. 9, descriptions thereof will be omitted.

In S407, the device driver 12, which is an example of the printer driver, issues a request to open a spool file to the shell 16 via the API after writing of the spool file (S406).

In S408, upon receiving a request to open a spool file, the shell 16 designates a file path to the spool file as a start option with reference to the table shown in FIG. 14C and starts the output control app 17. When the printer app, which is an example of the output control app 17, is started by the shell 16, the printer app executes processes for reading the spool file, output control, and so on (S409 to S411).

As described above, since the device driver 12 directly calls the shell 16 with an API, the number of user operations can be reduced.

The fifth embodiment may be configured such that whether to execute the call for the shell 16 using the API in S407 is determined via a setting screen that the device driver 12 provides. Alternatively, the fifth embodiment may be configured such that if the file path in the port object information in the local port monitor 13 includes a specific keyword, the device driver 12 calls the shell 16.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-045577, filed Mar. 7, 2013, which is hereby incorporated by reference herein in its entirety.

The invention claimed is:

1. An information processing apparatus that can execute an operating system that incorporates first output control software, the information processing apparatus comprising:
a memory; and a processor in communication with the memory, the processor configured to control a first control unit configured to perform control to write data requested to be output by a user to a predetermined file with a file name using an extension via a port monitor as a function of the first output control software, wherein the extension is designated by the vendor of the first output control software as setting in a setting file of the first output control software;

an acquisition unit configured to acquire the data written to the predetermined file as a function of second output control software downloaded from an application management server and installed; and a second control unit configured to perform output control on the acquired data to an external system on a network as a function of the second output control software, wherein the second output control software is downloaded from the application management server on the basis of the extension in accordance with control to write the data to the file via the port monitor and the downloaded second output control software is installed in the information processing apparatus.

2. The information processing apparatus according to claim 1, wherein a file path to the predetermined file indicates a storage area prepared for the user.

3. The information processing apparatus according to claim 1, further comprising a providing unit configured to search for an external system on a network and provide a selection screen on which the user can select an external system as a function of the second output control software.

4. The information processing apparatus according to claim 3, wherein an external system selected via the selection screen is set as a prescribed output target in the second output control software.

5. The information processing apparatus according to one of claim 1, setting for performing control to write data to the predetermined file is made as a function of the first output control software in accordance with a user operation based on a display screen that the second output control software provides.

6. The information processing apparatus according to claim 1, wherein after a file with a file name using attribute information of the data requested to be output and an extension is created, control to write data to the file is performed.

7. The information processing apparatus according to claim 1, wherein the second output control software is downloaded from the application management server and installed on the basis of the extension in accordance with a user operation on a notification screen provided by the operating system, the notification screen being displayed in accordance with control to write the data to the file via the port monitor.

8. The information processing apparatus according to claim 1, wherein the first output control software is a device driver.

9. The information processing apparatus according to claim 1, wherein the application management server manages an application for the operating system.

10. The information processing apparatus according to claim 1, wherein the external system is a printer on a network.

11. The information processing apparatus according to claim 1, wherein the external system is a storage service on a network.

12. A method for an information processing apparatus that can execute an operating system that incorporates first output control software, the method comprises the steps of:

performing control to write data requested to be output by a user to a predetermined file with an file name using an extension via a port monitor, wherein the extension is designated by the vendor of the first output control software as setting in a setting file of the first output control software;

acquiring the data written to the predetermined file as a function of second output control software downloaded from an application management server and installed; and performing output control of the acquired data to an external system on a network as a function of the second output control software, wherein the second output control software is downloaded from the application management server on the basis of the extension in accordance with control to write the data to the file via the port monitor and the downloaded second output control software is installed in the information processing apparatus.

13. The method according to claim 12, wherein the file with the file name of the data requested to be output and the extension predetermined is created, control to write data to the predetermined file is performed.

14. The method according to claim 13, wherein the extension predetermined as the setting of the first output control software is designated by the vendor of the first output control software.

15. The method according to claim 12, wherein the first output control software is a device driver.

16. The method according to claim 12, wherein the external system is a printer on a network.

17. The method according to claim 12, wherein the external system is a storage service on a network.

* * * * *